US012555764B2

(12) United States Patent
Jones et al.

(10) Patent No.: US 12,555,764 B2
(45) Date of Patent: Feb. 17, 2026

(54) MASS SPECTROMETRY IMAGING

(71) Applicant: Micromass UK Limited, Wilmslow (GB)

(72) Inventors: Emrys Jones, Manchester (GB); Richard Denny, Newcaste-under-Lyme (GB); Emmy Hoyes, Richmond (GB); Keith George Richardson, High Peak (GB)

(73) Assignee: Micromass UK Limited, Wilmslow (GB)

( * ) Notice: Subject to any disclaimer, the term of this patent is extended or adjusted under 35 U.S.C. 154(b) by 699 days.

(21) Appl. No.: 17/916,929

(22) PCT Filed: Mar. 26, 2021

(86) PCT No.: PCT/GB2021/050752
§ 371 (c)(1),
(2) Date: Oct. 4, 2022

(87) PCT Pub. No.: WO2021/198654
PCT Pub. Date: Oct. 7, 2021

(65) Prior Publication Data

US 2023/0154740 A1 May 18, 2023

(30) Foreign Application Priority Data

Mar. 31, 2020 (GB) ..................................... 2004678

(51) Int. Cl.
*H01J 49/16* (2006.01)
*H01J 49/00* (2006.01)

(52) U.S. Cl.
CPC ........ *H01J 49/165* (2013.01); *H01J 49/0004* (2013.01); *H01J 49/0031* (2013.01);
(Continued)

(58) Field of Classification Search
CPC .. H01J 49/165; H01J 49/0004; H01J 49/0031; H01J 49/0036; H01J 49/0045; H01J 49/164; H01J 49/004
(Continued)

(56) References Cited

U.S. PATENT DOCUMENTS

2007/0141719 A1 6/2007 Bui
2016/0155620 A1* 6/2016 Makarov ................ H01J 49/40
250/282

(Continued)

FOREIGN PATENT DOCUMENTS

CN 105321795 A 2/2016
CN 109642889 A 4/2019
WO 2017208025 A1 12/2017

OTHER PUBLICATIONS

Search Report for GB Application No. GB2004678.5, mailed Feb. 1, 2021.

(Continued)

*Primary Examiner* — Michael Maskell
(74) *Attorney, Agent, or Firm* — Goodwin Procter LLP

(57) ABSTRACT

A method of analysing a sample comprises analysing a sample in a first mode of operation so as to produce a spatially resolved data set representative of the sample, and analysing the data set so as to identify one or more regions of the sample. For each of one or more identified regions of the sample, a tandem mass spectrometry (MS/MS) data set is produced for that region by determining a path through the region, and analysing the sample along the path using Desorption Electrospray Ionisation ("DESI") in a tandem mass spectrometry (MS/MS) mode of operation.

18 Claims, 4 Drawing Sheets

(52) U.S. Cl.
CPC ...... *H01J 49/0036* (2013.01); *H01J 49/0045* (2013.01); *H01J 49/164* (2013.01)

(58) Field of Classification Search
USPC .................................................. 250/281, 282
See application file for complete search history.

(56) References Cited

U.S. PATENT DOCUMENTS

| | | | |
|---|---|---|---|
| 2018/0271502 A1 | 9/2018 | Zarrine-Afsar et al. | |
| 2019/0272984 A1* | 9/2019 | Takeshita ............ | H01J 49/0031 |

OTHER PUBLICATIONS

International Search Report and Written Opinion for International Application No. PCT/GB2021/050752, mailed Jul. 1, 2021.

Combined Search and Examination Report for GB Application No. GB2104297.3, mailed Aug. 18, 2021.

OuYang, C., et al., “High Throughput In Situ DDA Analysis of Neuropeptides by Coupling Novel Multiplex Mass Spectrometric Imaging (MSI) with Gas Phase Fractionation”, Journal of the American Society of Mass Spectrometry, 26(12):1992-2001, Dec. 2015.

* cited by examiner

MASS SPECTROMETRY IMAGING

CROSS-REFERENCE TO RELATED APPLICATIONS

This application is a U.S. national phase filing claiming the benefit of and priority to International Patent Application No. PCT/GB2021/050752, filed Mar. 26, 2021, which claims priority from and the benefit of United Kingdom patent application No. 2004678.5 filed on Mar. 31, 2020. The entire content of these applications is incorporated herein by reference.

FIELD OF THE INVENTION

The present invention relates generally to analytical instruments such as mass and/or ion mobility spectrometers, and in particular to methods of imaging a sample using an analytical instrument such as mass and/or ion mobility spectrometer.

BACKGROUND

Mass Spectrometry Imaging (MSI) can provide very rich datasets with hundreds or thousands of peaks in each of tens of thousands of pixels. However, this provides a problem to the analyst when it comes to understanding the results obtained, as molecular identification can be very challenging.

The Applicant believes that there remains scope for improvements to Mass Spectrometry Imaging techniques.

SUMMARY

According to an aspect, there is provided a method of analysing a sample, the method comprising:

- analysing a sample in a first mode of operation so as to produce a spatially resolved data set representative of the sample;
- analysing the data set so as to identify one or more regions of the sample; and
- for each of one or more identified regions of the sample, producing a tandem mass spectrometry (MS/MS) data set for that region by:
  - determining a path through the region; and
  - analysing the sample along the path by analysing the sample along at least part of the path in a tandem mass spectrometry (MS/MS) mode of operation.

Various embodiments are directed to a method of analysing a sample in which the sample is analysed in a first mode of operation, such as a Mass Spectrometry Imaging (MSI) mode of operation, so as to produce a spatially resolved data set representative of the sample, such as a mass spectrometry image of the sample. This may comprise moving an analysis probe relative to the sample or moving the sample relative to an analysis probe, for example in a line-by-line pattern, and repetitively sampling (and analysing) the sample, so as to build up the spatially resolved data set.

The data set is analysed so as to identify one or more regions of the sample. The analysis may so as to identify multiple (chemically) distinct regions of the sample. Thus, each identified region may be a substantially (chemically) homogenous region of the sample, and each identified region may be (chemically) distinct from each other identified region.

In various embodiments, for each of one or more of the one or more identified regions of the sample, a tandem mass spectrometry (MS/MS) data set for that region is produced. In other words, for each region, a data set comprising a product ion spectrum for each of plural different parent ions is produced.

This is done by determining a path through the region (where the path is constrained to remain within the region), and then analysing the sample along the path in a tandem mass spectrometry (MS/MS) mode of operation. This may comprise moving the analysis probe relative to the sample or moving the sample relative to the analysis probe, so as to follow the path, and repetitively sampling (and analysing) the sample, so as to produce the tandem mass spectrometry (MS/MS) data set. As the probe or sample is moved along the path, each of plural different parent ions may be selected (in turn) and analysed so as to produce a corresponding product ion data set.

Determining and using a path that is configured such that the molecular composition of the sample is relatively constant along the path in this manner can provide sufficient time for the analysis to produce a detailed tandem mass spectrometry (MS/MS) data set, such as a "full" tandem mass spectrometry (MS/MS) data set, that includes a product ion spectrum for each of plural parents ions of interest.

The so-produced tandem mass spectrometry (MS/MS) data set for each region may then be associated with the spatially resolved data for that region.

In this way, the spatially resolved data set (mass spectrometry image) can be supplemented with a tandem mass spectrometry (MS/MS) data set in respect of each (chemically) homogenous region of the sample. The provision of this additional information for each region can accordingly facilitate and improve confidence in the identification of each region.

It will be appreciated, therefore, that various embodiments provide an improved method of analysing a sample.

The first mode of operation may be a Data Independent Analysis (DIA) mode of operation.

Analysing the sample in the first mode of operation may comprise analysing the sample using Desorption Electrospray Ionisation ("DESI").

The first mode of operation may be a Mass Spectrometry (MS) mode of operation or a mode of operation in which parent ions are alternatively activated, fragmented or reacted so as to produce product ions, and not activated, fragmented or reacted or activated, fragmented or reacted to a lesser degree.

The spatially resolved data set may comprise a mass spectrometry image of the sample.

The spatially resolved data set may comprise an optical, IR or UV image of the sample, a fluorescence image of the sample, or a Raman spectroscopy image of the sample.

Analysing the data set may comprise analysing the data set so as to identify one or more chemically distinct regions of the sample.

One or more of the identified regions may be a substantially homogenous region of the sample.

Analysing the sample along the path may comprise analysing the sample along the path in a Data Directed Analysis (DDA) mode of operation.

Analysing the sample along the path may comprise analysing the sample along the path using Desorption Electrospray Ionisation ("DESI").

Analysing the sample along the path may comprise:

- analysing the sample along a first portion of the path in a mass spectrometry mode of operation; and then analysing the sample along a second different portion of the path in the tandem mass spectrometry (MS/MS) mode of operation.

Analysing the sample along the path may comprise:

analysing the sample along the first portion of the path in the mass spectrometry mode of operation so as to produce mass spectrometry data;

determining one or more parent ions of interest from the mass spectrometry data; and then analysing the sample along the second different portion of the path by analysing each of the one or more determined parent ions of interest in the tandem mass spectrometry (MS/MS) mode of operation.

Analysing the sample along the path may comprise switching between a mass spectrometry ("MS") mode of operation and a tandem mass spectrometry ("MS/MS") mode of operation plural times while analysing the sample along the path.

The method may comprise:

determining, from the results of each respective mass spectrometry ("MS") mode of operation one or more parent ions of interest to be analysed in the subsequent tandem mass spectrometry ("MS/MS") mode of operation; and analysing each of the determined one or more parents ions of interest in the subsequent tandem mass spectrometry ("MS/MS") mode of operation so as to produce a product ion spectrum for each parent ion.

The method may comprise excluding parent ions of interest which have already been analysed in a preceding tandem mass spectrometry ("MS/MS") mode of operation from analysis in any subsequent tandem mass spectrometry ("MS/MS") mode of operation.

The method may comprise:

determining one or more parent ions of interest from the spatially resolved data set; and analysing the sample along the path by analysing each of the one or more determined parent ions of interest in the tandem mass spectrometry (MS/MS) mode of operation.

The Mass Spectrometry (MS) mode of operation may be a mode of operation in which (parent) ions produced from the sample (by an ion source) are analysed (by a mass analyser) so as to determine the mass to charge ratio of the (parent) ions.

The tandem mass spectrometry (MS/MS) mode of operation may be a mode of operation in which product ions produced from parents ions from the sample (produced by the ion source) are analysed (by a mass analyser) so as to determine the mass to charge ratio of the product ions.

Analysing the sample in a tandem mass spectrometry (MS/MS) mode of operation may comprise:

selecting at least one parent ion of interest;

activating, fragmenting or reacting the at least one parent ion so as to produce product ions; and analysing the product ions so as to produce a product ion data set for the at least one parent ion of interest.

Analysing the sample in the tandem mass spectrometry (MS/MS) mode of operation may comprise:

selecting each parent ion of plural parent ions of interest sequentially in turn;

activating, fragmenting or reacting each parent ion of the plural parent ions (sequentially in turn) so as to produce product ions for each parent ion; and analysing the product ions (sequentially in turn) so as to produce a product ion data set for each parent ion of the plural parents ions of interest.

The method may comprise associating the tandem mass spectrometry (MS/MS) data set for each region with spatially resolved mass spectrometry data for that region so as to produce a spatially resolved mass spectrometry data set representative of the sample that is supplemented with a tandem mass spectrometry (MS/MS) data set in respect of each of the one or more identified chemically distinct regions of the sample.

The method may comprise analysing mass spectrometry data and tandem mass spectrometry (MS/MS) data for a region so as to classify the region.

According to an aspect, there is provided an analytical instrument comprising:

one or more analysers configured to analyse a sample; and a control system configured to cause the analytical instrument to:

analyse a sample in a first mode of operation so as to produce a spatially resolved data set representative of the sample;

analyse the data set so as to identify one or more regions of the sample; and for each of one or more identified regions of the sample, produce a tandem mass spectrometry (MS/MS) data set for that region by:

determining a path through the region; and analysing the sample along the path by analysing the sample along at least part of the path in a tandem mass spectrometry (MS/MS) mode of operation.

The analytical instrument may comprise a Desorption Electrospray Ionisation ("DESI") ion source, a Matrix Assisted Laser Desorption Ionisation ("MALDI") ion source, a Rapid Evaporative Ionisation Mass Spectrometry ("REIMS") ion source, or a Laser Assisted Rapid Evaporative Ionisation Mass Spectrometry ("LA-REIMS") ion source configured to produce ions from the sample.

The analytical instrument may comprise a mass analyser.

The analytical instrument may comprise a filter and an activation, collision, fragmentation or reaction device.

The analytical instrument may comprise a sample stage and an analysis probe.

The sample stage may be configured to be moveable relative to the analysis probe and/or the analysis probe may be configured to be moveable relative to the sample stage.

The control system may be configured to cause the analytical instrument to analyse the sample along the path by:

analysing the sample along a first portion of the path in a mass spectrometry mode of operation; and then analysing the sample along a second different portion of the path in the tandem mass spectrometry (MS/MS) mode of operation.

The control system may be configured to cause the analytical instrument to analyse the sample along the path by:

analysing the sample along the first portion of the path in the mass spectrometry mode of operation so as to produce mass spectrometry data;

determining one or more parent ions of interest from the mass spectrometry data; and then analysing the sample along the second different portion of the path by analysing each of the one or more determined parent ions of interest in the tandem mass spectrometry (MS/MS) mode of operation.

The control system may be configured to:

determine one or more parent ions of interest from the spatially resolved data set; and cause the analytical instrument to analyse the sample along the path by analysing each of the one or more determined parent ions of interest in the tandem mass spectrometry (MS/MS) mode of operation.

The analytical instrument may comprise a mass and/or ion mobility spectrometer.

BRIEF DESCRIPTION OF THE DRAWINGS

Various embodiments will now be described, by way of example only, and with reference to the accompanying drawings in which.

DETAILED DESCRIPTION

Figure 1:
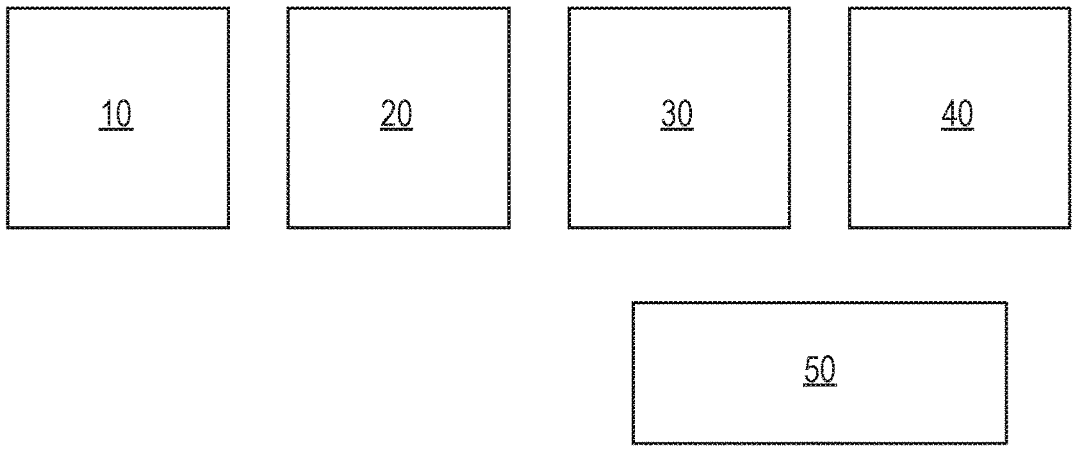
FIG. 1 shows schematically an analytical instrument in accordance with various embodiments.

FIG. 1 shows schematically an analytical instrument comprising a mass and/or ion mobility spectrometer in accordance with various embodiments.

As show in FIG. 1, the analytical instrument comprises an ion source 10, a filter 20 arranged downstream of the ion source 10, an activation, collision, fragmentation or reaction device 30 arranged downstream of the filter 20, and an analyser 40 arranged downstream of the activation, collision, fragmentation or reaction device 30.

The ion source 10 is configured to generate ions from a sample. The ion source 10 may comprise any ion source suitable for mass spectrometry imaging, such as for example: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; (xxx) a Low Temperature Plasma ("LTP") ion source; (xxxi) a Helium Plasma Ionisation ("HePI") ion source; (xxxii) a Rapid Evaporative Ionisation Mass Spectrometry ("REIMS") ion source; and/or (xxxiii) a Laser Assisted Rapid Evaporative Ionisation Mass Spectrometry ("LA-REIMS") ion source.

In various particular embodiments, the ion source 10 comprises a Desorption Electrospray Ionisation ("DESI") ion source, a Matrix Assisted Laser Desorption Ionisation ("MALDI") ion source a Rapid Evaporative Ionisation Mass Spectrometry ("REIMS") ion source, or a Laser Assisted Rapid Evaporative Ionisation Mass Spectrometry ("LA-REIMS") ion source.

Figure 2:
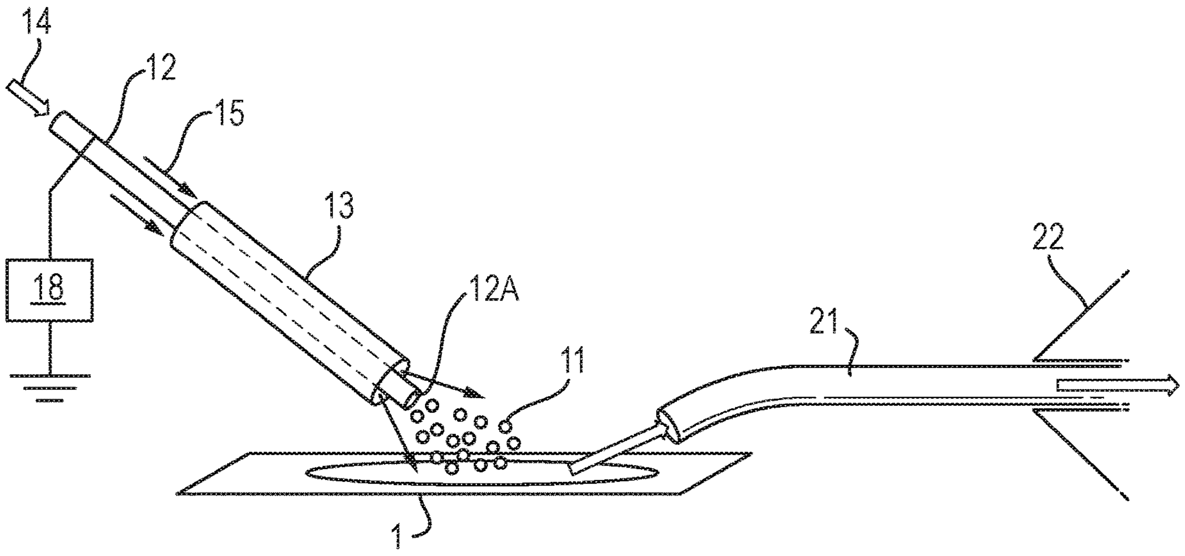
FIG. 2 shows a Desorption Electrospray Ionisation ("DESI") ion source in accordance with various embodiments.

FIG. 2 shows a desorption electrospray ionisation ("DESI") ion source in accordance with embodiments. As shown in FIG. 2, a sprayer comprises a solvent capillary 12 and gas capillary 13. The solvent capillary 12 (emitter) is arranged coaxially within the gas capillary 13, with the solvent-emitting outlet or tip 12A of the solvent capillary 12 extending beyond the distal end of the gas capillary 13. A flow of solvent 14 supplied to the solvent capillary 12 is charged by means of a high voltage source 18, and is directed towards a sample 1, assisted by a nebulising gas flow 15 supplied to the gas capillary 13.

The resulting spray of (primary) electrically charged droplets 11 can desorb analyte material from the surface of the sample 1, and (secondary) droplets carrying desorbed ionised analytes may then travel via a transfer capillary 21 into an atmospheric pressure interface 22 of an analytical instrument, such as a mass and/or ion mobility spectrometer.

As shown in FIG. 2, the ion source 10 may comprise a sample stage configured to hold the sample 1. The sample stage may be configured to be moveable in two (horizontal) dimensions (relative to the sprayer and the transfer capillary 21), such that different regions of the sample can be analysed.

Where the ion source 10 comprises a Matrix Assisted Laser Desorption Ionisation ("MALDI") ion source, a sample stage may be configured to be moveable in two (horizontal) dimensions relative to a laser probe of the Matrix Assisted Laser Desorption Ionisation ("MALDI") ion source.

More generally, a sample stage may be configured to be moveable (for example in two (horizontal) dimensions) relative to an analysis probe of the ion source and/or the analysis probe may be configured to be moveable (for example in two (horizontal) dimensions) relative to the sample stage, such that different regions of the sample can be analysed.

In these embodiments, either the sample stage or the analysis probe may have a fixed position (and only the analysis probe or the sample stage may be moveable), or alternatively both the sample stage and the analysis probe may be moveable. For example, one of the stage and the probe may be configured to move in a first (x) (horizontal) direction, and the other of the stage and the probe may be configured to move in a second (y) orthogonal (horizontal) direction, such that different regions of the sample can be analysed.

Returning to FIG. 1, downstream of the ion source 10 is a filter 20. The filter 20 may comprise a mass filter such as a quadrupole mass filter.

The filter 20 may be configured to filter ions produced by the ion source 10, so as to select ions having a particular mass to charge ratio. For example, the filter 20 may be configured to select ions corresponding to parent ions of interest by filtering ions received from the ion source 10 according to their mass to charge ratio.

To do this, the filter 20 may be operated such that ions having a desired mass to charge ratio (corresponding to the mass to charge ratio of at least one parent ion) or having mass to charge ratios within a desired mass to charge ratio range (which range may be centred on the mass to charge ratio of at least one parent ion) will be retained and/or onwardly transmitted by the filter 20. Ions having mass to charge ratio values other than the desired mass to charge ratio or outside of the desired mass to charge ratio range may be lost and/or substantially attenuated. Thus, the filter 20 may be configured to select (isolate) ions within a mass to charge ratio window or range that corresponds to (that is centred on the mass to charge ratio of) a (single) parent ion of interest (or a set of a few parents ions of interest).

In various embodiments, where it is desired to select ions corresponding to each of plural parent ions of interest sequentially in turn (one by one), the filter 20 may be operated so as to sequentially select and transmit each of said plural parent ions of interest. This may involve altering the set mass (that is, the mass to charge ratio or the centre of the mass to charge ratio range at which ions are selected and/or transmitted by the filter 20) of the filter 20 so as to sequentially select and transmit each of said plural parent ions of interest.

The filter may also be operated in a transmission (non-filtering) mode or a relatively wide pass-band mode of operation such that a relatively large amount (most of all) of the ions produced by the ion source 10 are transmitted by the filter 20, without being filtered (selected) according to their mass to charge ratio.

Referring again to FIG. 1, downstream of the filter 20 is an activation, collision, fragmentation or reaction device 30. The activation, collision, fragmentation or reaction device 30 may be configured to activate, fragment or react (parent) ions received from the filer 20 so as to produce product ions.

The activation, collision, fragmentation or reaction device 30 may comprise any suitable activation, collision, fragmentation or reaction device. For example, the activation, collision, fragmentation or reaction device 30 may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and/or (xxix) an Electron Ionisation Dissociation ("EID") fragmentation device.

Downstream of the activation, collision, fragmentation or reaction device 30 is an analyser 40 such as a mass analyser. The analyser 40 may be configured to analyse ions received from the activation, collision, fragmentation or reaction device 30, so as to determine one or more physico chemical properties of the ions, such as their mass to charge ratio and/or ion mobility.

In various embodiments, the analyser 40 comprises an orthogonal acceleration Time of Flight mass analyser. However, more generally the mass analyser may comprise any suitable mass analyser such as a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

It should be noted that FIG. 1 is merely schematic, and that the analytical instrument may (and in various embodiments does) include other components, devices and functional elements to those shown in FIG. 1.

For example, the analytical instrument may comprise one or more separators such as an ion mobility separator, one or more ion guides, one or more ion traps, and so on.

As shown in FIG. 1, the analytical instrument may comprise a control system 50, that may be configured to control the operation of the analytical instrument, for example in the manner of the various embodiments described herein. The control system may comprise suitable control circuitry (a controller) that is configured to cause the instrument to operate in the manner of the various embodiments described herein. The control system may comprise suitable processing circuitry (a processor) configured to perform any one or more or all of the necessary processing and/or post-processing operations in respect of the various embodiments described herein. In various embodiments, the control system may comprise a suitable computing device, a microprocessor system, a programmable FPGA (field programmable gate array), and the like.

The analytical instrument may be operated in various modes of operation including a mass spectrometry ("MS") mode of operation and a tandem mass spectrometry ("MS/MS") mode of operation.

In the mass spectrometry ("MS") mode of operation, parent ions produced by the ion source may be analysed such as being mass analysed by the analyser 40. In this mode of operation, ions produced by the ion source 10 may bypass the activation, collision, fragmentation or reaction device 30 or the activation, collision, fragmentation or reaction device 30 may be operated in a mode in which ions are not activated, fragmented or reacted (or in which ions are activated, fragmented or reacted to a relatively small degree). In this mode of operation, the filter 20 may be operated in its transmission (non-filtering) mode or relatively wide pass-band mode of operation (as described above) such that a relatively large amount (most of all) of the ions produced by the ion source 10 are analysed by the analyser 40. In this way, one or more mass spectra of the (parent) ions produced by the ion source 10 may be produced.

In the tandem mass spectrometry ("MS/MS") mode of operation product ions produced by the activation, collision, fragmentation or reaction device 30 may be analysed by the analyser 40. In this mode of operation, ions produced by the ion source 10 may be activated, fragmented or reacted so as to produce product ions. In this mode of operation, the filter 20 may be operated in its filtering (selecting) mode of operation (as described above) so as to select parent ions of interest. The filter 20 may be configured to select ions corresponding to each of plural parent ions of interest sequentially in turn (as described above), such that the product ions from each of the plural parents ions of interest are analysed by the analyser 40 sequentially in turn. In this way, a mass spectrum of product ions in respect of each parent ion of interest may be produced.

In this mode of operation, the filter 20 may be configured to select a single parent ion at any given time. Alternatively, at some or all times, the filter 20 may be configured to select a subset of plural parent ions of interest. Intentionally selecting plural parent ions at the same time will produce mixed tandem mass spectrometry ("MS/MS") spectra, and can improve the duty cycle of the tandem mass spectrometry ("MS/MS") mode of operation.

Alternatively, in the tandem mass spectrometry ("MS/MS") mode of operation, the filter 20 may be configured to sequentially populate an ion trap with a subset of plural parent ions of interest. These parent ions may then be co-fragmented and the resulting product ions may be mass analysed. This may be particularly advantageous for instruments for which the mass analysis step is relatively slow, such as for example Fourier Transform-MS (FT-MS) instruments. In these embodiments, the selection step can take place in parallel with mass analysis of a previous ion population.

Various embodiments are directed to a method in which a sample is analysed in a first mode of operation so as to produce a spatially resolved data set representative of the sample, the data set is analysed so as to identify one or more regions of the sample, and for each of one or more identified regions of the sample, a tandem mass spectrometry (MS/MS) data set for that region is produced. This is done by determining a path through the region, and analysing the sample along the path in a tandem mass spectrometry (MS/MS) mode of operation.

The sample may comprise any suitable sample, such as a sample having a surface that is to be imaged. For example, the sample may comprise a biological sample such as a tissue section.

The sample is analysed in a first mode of operation so as to produce a spatially resolved data set representative of the sample.

The first mode of operation may be any suitable mode of operation such as a Data Independent Analysis (DIA) mode of operation.

In various embodiments, the first mode of operation is a Mass Spectrometry (MS) mode of operation, that is, a mode of operation in which mass spectra (of parent ions of the sample) are produced (as described above).

In various other embodiments, the first mode of operation may be a mode of operation in which parent ions are alternatively activated, fragmented or reacted so as to produce product ions, and not activated, fragmented or reacted or activated, fragmented or reacted to a lesser degree (such as a $MS^E$, $HDMS^E$ or "SONAR" mode of operation). Thus, the first mode of operation may be a mode of operation in which mass spectra of parent ions and product ions are produced.

In various particular embodiments, the first mode of operation is a Mass Spectrometry Imaging (MSI) mode of operation, that is, a mode of operation in which mass spectral data (such as a mass spectrum of parent ions of the sample, and optionally a mass spectrum of product ions) is produced for each of plural positions (pixels) on the sample.

As such, the spatially resolved data set representative of the sample may comprise a data set comprising mass spectral data (one or more mass spectra) for each of plural positions (pixels) on the sample. In other words, the spatially resolved data set representative of the sample may comprise a mass spectrometry image of the sample.

In these embodiments, the plural positions (pixels) on the sample may comprise an array (grid) of positions on the sample. Other arrangements would, however, be possible.

The spatially resolved data set may be produced by moving an analysis probe relative to the sample or moving the sample relative to an analysis probe, for example in a line-by-line pattern, and repetitively sampling (and analysing) the sample, so as to build up the spatially resolved data set (using the analytical instrument in the manner described above).

However, in various other embodiments, the spatially resolved data set may comprise another type of spatially resolved data set that is representative of the sample. For example, the spatially resolved data set may comprise an (optical, IR or UV) image of the sample, a fluorescence image of the sample, a Raman spectroscopy image of the sample, and so on.

According to various embodiments, the spatially resolved data set is analysed so as to identify one or more regions of the sample. Where the spatially resolved data set comprises a mass spectrometry image, this may comprise analysing the mass to charge ratio and/or intensity of peaks appearing within each mass spectrum in order to identify one or more regions of the sample.

The analysis may so as to identify multiple chemically distinct regions of the sample. One or more or each of the identified regions may be a substantially (chemically) homogenous region of the sample (and each identified region may be (chemically) distinct from each other identified region).

Any suitable data processing technique(s) may be used to analyse the sample in this manner. For example, where the spatially resolved data is a mass spectrometry image, data processing technique(s) may be used including data reduction techniques such as principal component analysis (PCA), uniform manifold approximation and projection (UMAP), T-distributed Stochastic Neighbour Embedding (t-SNE), and the like.

This analysis may be performed after the entire spatially resolved data set has been produced, or the analysis may be performed "on-the-fly" while the spatially resolved data is being produced.

Optionally, the spatially resolved data set may also be analysed so as to (provisionally) determine the chemical composition of each identified region. This may comprise, for example, (optionally deconvolving and/or de-isotoping (and so on) and then) comparing the (optionally de-convolved and/or de-isotoped) mass spectrometry data for the region to a classification library, as appropriate. Again, this analysis may be performed after the entire spatially resolved data set has been produced, or "on-the-fly" while the spatially resolved data is being produced.

Optionally, the spatially resolved data set may also be analysed so as to determine one or more parameters or settings for the subsequent analysis of each region. For example, one or more parameters or settings for the activation, collision, fragmentation or reaction device may be determined based on analysis of the spatially resolved data set. For example, an ion mode may be selected (from positive or negative ion mode), and/or a fragmentation technique may be selected (from any one of the activation, collision, fragmentation or reaction devices described herein). This determination may be based on any suitable aspect of or derived from the spatially resolved data set, such as mass to charge ratio (m/z), charge state, putative identification, and so on.

In various embodiments, for each of one or more of the one or more identified regions of the sample, a tandem mass spectrometry (MS/MS) data set for that region is produced. In other words, for each of one or more regions, a data set comprising a product ion spectrum for each of plural different parent ions (of interest) is produced.

This is done by determining a path through the region, and then analysing the sample along the path in a tandem mass spectrometry (MS/MS) mode of operation.

In other words, a sub-region of each region in the form of a path (which sub-region will already have been analysed in the first mode of operation) is re-analysed in the tandem mass spectrometry (MS/MS) mode of operation. It should be noted in this regard that Desorption Electrospray Ionisation ("DESI") is particularly suited to various embodiments, as DESI analysis allows the same surface to be resampled with a comparable response.

A single analytical instrument may be used to produce the spatially resolved data set and to produce the tandem mass spectrometry (MS/MS) data set. Alternatively, a first analytical instrument may be used to produce the spatially resolved data set, and a second different analytical instrument may be used to produce the tandem mass spectrometry (MS/MS) data set.

For example, a quadrupole-Time-of-Flight (Q-TOF) instrument may be used to produce the spatially resolved data set, and a tandem quadrupole instrument may be used to produce the tandem mass spectrometry (MS/MS) data set. The use of different instruments in this manner may result in a high throughput workflow.

The path may comprise a sub-region of the region (in the form of a path). The path may comprise a sub-set of the positions (pixels) of the sample that correspond to the region. The path may comprise a continuous or non-continuous path through the region, where the path is constrained to remain within the region.

Analysing the sample along the path may comprise moving an (the) analysis probe relative to the sample or moving the sample relative to the analysis probe, so as to follow the path, and repetitively sampling (and analysing) the sample, so as to produce the tandem mass spectrometry (MS/MS) data set (using the analytical instrument in the manner described above).

The analysis of the sample along the path may use all of the determined path. Alternatively, less than all of the determined path may be used. For example the analysis in respect of a given region may be terminated when sufficient data has been collected for that region (such that less than all of the determined path is (re-)analysed).

As the analysis (the probe or sample) moves along the path, each of plural different parent ions may be selected (in turn) by the filter 20 and analysed by the analyser 40 so as to produce a product ion data set (mass spectrum) for each parent ion.

The parent ions that are to be selected by the filter 20 can be determined in any suitable manner.

Analysing the sample along the path may comprise analysing the sample along the path in a Data Directed Analysis (DDA) mode of operation.

In various embodiments, as the sample is being analysed along the path, the analytical instrument may be switched between a mass spectrometry ("MS") mode of operation (as described above) and a tandem mass spectrometry ("MS/MS") mode of operation (as described above) one or more times.

Thus, the method may comprise analysing the sample along the path by: analysing the sample along a first portion of the path in a mass spectrometry mode of operation, and then analysing the sample along a second different (adjacent) portion of the path in a tandem mass spectrometry (MS/MS) mode of operation. The method may comprise then analysing the sample along a third different (adjacent) portion of the path in a mass spectrometry mode of operation, and then analysing the sample along a fourth different (adjacent) portion of the path in a tandem mass spectrometry (MS/MS) mode of operation, and so on.

The results of each mass spectrometry ("MS") mode of operation (that is, the mass spectrum of the ions produced by the ion source 10) may be analysed so as to determine (identify) one or more parent ions of interest, and then each of the determined (identified) one or more parents ions of interest may be analysed in a (immediately) subsequent tandem mass spectrometry ("MS/MS") mode of operation (by selecting the parent ion, and activating, fragmenting or reacting the parent ion) so as to produce a product ion spectrum for each parent ion of interest (using the analytical instrument in the manner described above).

In these embodiments, an exhaustive or full tandem mass spectrometry (MS/MS) data set may be produced for each region, for example by switching the analytical instrument between a mass spectrometry ("MS") mode of operation and a tandem mass spectrometry ("MS/MS") mode of operation plural times as the sample is analysed along the path. The results of each respective mass spectrometry ("MS") mode of operation (i.e. the mass spectrum of the ions produced by the ion source 10) may be analysed so as to determine one or more parent ions of interest to be analysed in the (immediately) subsequent tandem mass spectrometry ("MS/MS") mode of operation, and then each of the determined one or more parents ions of interest may be analysed in the (immediately) subsequent tandem mass spectrometry ("MS/MS") mode of operation so as to produce a product ion spectrum for each parent ion.

For example, the results of an initial mass spectrometry ("MS") mode of operation (i.e. the mass spectrum of the ions produced by the ion source 10) may be analysed so as to determine a first set of one or more parent ions of interest to be analysed in an initial tandem mass spectrometry ("MS/MS") mode of operation, and then each of the determined one or more parents ions of interest in the first set may be sequentially analysed in the initial tandem mass spectrometry ("MS/MS") mode of operation so as to produce a product ion spectrum for each parent ion of the first set (using the analytical instrument in the manner described above). The results of a second (immediately subsequent) mass spectrometry ("MS") mode of operation (i.e. the mass spectrum of the ions produced by the ion source 10) may be analysed so as to determine a second set of one or more parent ions of interest to be analysed in a second tandem mass spectrometry ("MS/MS") mode of operation, and then each of the determined one or more parents ions of interest in the second set may be sequentially analysed in the second tandem mass spectrometry ("MS/MS") mode of operation so as to produce a product ion spectrum for each parent ion of the second set (using the analytical instrument in the manner described above). The results of a third (immediately subsequent) mass spectrometry ("MS") mode of operation may be analysed so as to determine a third set of one or more parent ions of interest to be analysed in a second tandem mass spectrometry ("MS/MS") mode of operation, and so on.

These embodiments may employ an exclusion list approach, whereby parent ions of interest which have already been analysed in a preceding tandem mass spectrometry ("MS/MS") mode of operation are excluded from analysis (are not analysed) in any subsequent tandem mass spectrometry ("MS/MS") modes of operation (for the particular region in question).

The parent ions that are included in each respective set of parent ions can be selected in any suitable manner.

In various embodiments, the first set of parent ions may comprise parent ions identified in the initial mass spectrometry ("MS") mode of operation that most closely meet one or more criteria, the second set of parent ions may comprise parent ions identified in the second mass spectrometry ("MS") mode of operation (excluding the parent ions of the first set) that next most closely meet one or more criteria, and so on. For example, the first set of parent ions may comprise the most abundant parent ions identified in the initial mass spectrometry ("MS") mode of operation, the second set of parent ions may comprise the most abundant parent ions identified in the second mass spectrometry ("MS") mode of operation (excluding the parent ions of the first set), and so on.

Additionally or alternatively, there may be one or more parent ions of particular interest, which may for example be defined by a user, that may be prioritised for analysis in a tandem mass spectrometry ("MS/MS") mode of operation. Additionally or alternatively, there may be one or more parent ions, which may for example be defined by a user, that may be excluded from analysis in a tandem mass spectrometry ("MS/MS") mode of operation.

By performing a sufficient number of repeats of mass spectrometry ("MS") and tandem mass spectrometry ("MS/MS") modes of operation in this manner, for example until all (identifiable) parents ions of interest have been analysed in a tandem mass spectrometry ("MS/MS") mode of operation (for example, until parent ions of interest that have yet to be analysed in a tandem mass spectrometry ("MS/MS") mode of operation can no longer be identified in a mass spectrometry ("MS") mode of operation), an exhaustive or full tandem mass spectrometry (MS/MS) data set can be produced.

In various other embodiments, as the sample is analysed along the path, the analytical instrument may be operated only in a tandem mass spectrometry ("MS/MS") mode of operation.

In these embodiments, the spatially resolved data set may be analysed so as to determine one or more parent ions of interest (in each region), and then each of the determined one or more parents ions of interest (for a region) may be sequentially analysed in the tandem mass spectrometry ("MS/MS") mode of operation so as to produce a product ion spectrum for each parent ion of interest (using the analytical instrument in the manner described above).

Again, an exhaustive or full tandem mass spectrometry (MS/MS) data set may be produced for each region by sequentially analysing all parents ions of interest identified from the spatially resolved data set in the tandem mass spectrometry ("MS/MS") mode of operation for the region (using the analytical instrument in the manner described above).

Where, as described above, the spatially resolved data set comprises mass spectra of both parent ions and product ions (for example where the first mode of operation is a mode of operation in which parent ions are alternatively activated, fragmented or reacted so as to produce product ions, and not activated, fragmented or reacted or activated, fragmented or reacted to a lesser degree (such as a $MS^E$, $HDMS^E$ or "SONAR" mode of operation), the tandem mass spectrometry ("MS/MS") mode of operation may be targeted towards parent ions that have not been identified with sufficient certainty in the spatially resolved data set (and the so-produced tandem mass spectrometry ("MS/MS") data may be used to confirm the identity of these parent ions).

It will be appreciated that determining and using a path that is configured such that the molecular composition of the sample is relatively constant along the path in the manner described above, can provide sufficient time for the analysis to produce a detailed tandem mass spectrometry (MS/MS) data set, such as a "full" tandem mass spectrometry (MS/MS) data set, that includes a product ion spectrum for each of plural parents ions of interest.

The above process of determining a path through an identified region and analysing the sample along the path in a tandem mass spectrometry (MS/MS) mode of operation may be repeated for one or more or each of the other identified regions.

Thus, the method may comprise: producing a tandem mass spectrometry (MS/MS) data set for a first region by determining a first path through the first region, and analysing the sample along the first path in a tandem mass spectrometry (MS/MS) mode of operation (in the manner described above), and then producing a tandem mass spectrometry (MS/MS) data set for a second (different) region by determining a second (different) path through the second region, and analysing the sample along the second path in a tandem mass spectrometry (MS/MS) mode of operation (in the manner described above). The method may comprise: producing a tandem mass spectrometry (MS/MS) data set for a third (different) region by determining a third path through the third region, and analysing the sample along the third path in a tandem mass spectrometry (MS/MS) mode of operation (in the manner described above), and so on.

These embodiments may optionally employ an exclusion list approach, whereby one or more parent ions of interest which have already been analysed in respect of a previous region are excluded from analysis (are not analysed) in respect of one or more subsequent regions.

The so-produced tandem mass spectrometry (MS/MS) data set for each region may then be associated with the spatially resolved data for that region.

In this way, the spatially resolved data set (mass spectrometry image) can be supplemented with a tandem mass spectrometry (MS/MS) data set in respect of each (chemically) homogenous region of the sample. The provision of this additional information for each region can accordingly facilitate and improve confidence in the identification of each region.

In various embodiments, mass spectrometry data and the tandem mass spectrometry (MS/MS) data collected in respect of each region may be analysed so as to determine (so as to classify) the chemical composition of the region. This may comprise, for example, (optionally deconvolving and/or de-isotoping (and so on), and then) comparing the (optionally deconvolved and/or de-isotoped) mass spectrometry data and the tandem mass spectrometry (MS/MS) data to a classification library, as appropriate.

This analysis may be performed after all of the mass spectrometry data and tandem mass spectrometry (MS/MS) data has been produced (for example at the end of an experimental acquisition), or "on-the-fly" while the data is being produced (during an experimental acquisition).

Where this analysis is performed while the data is being produced, the results of the analysis (the classification) may be used to affect (to guide) further analysis.

In various embodiments, the so-produced classification for each region may be provided to a user and/or may be associated with the spatially resolved data for each region. In this way, the spatially resolved data set (mass spectrometry image) can be supplemented with a classification in respect of each (chemically) homogenous region of the sample.

It will be appreciated from the above that various embodiments are directed to techniques of automated Data-Directed Acquisition (DDA) for Mass Spectrometry Imaging (MSI). Various embodiments provide full information reporting for each sample.

Various embodiments supplement the very rich datasets, which may have hundreds or thousands of peaks in each of tens of thousands of pixels, produced by Mass Spectrometry Imaging (MSI). Various embodiments facilitate improved understanding of and molecular identification in MSI data.

Accurate mass may be provided by Mass Spectrometry Imaging (MSI) data, and may be analysed to determine candidate molecules for the spectral features present in the data. Various embodiments may provide further information such as molecular fragmentation patterns, which may be used to make a more confident confirmation.

Various embodiments may be automated, and may be configured so that the MS/MS data is collected in the same experimental acquisition as the Mass Spectrometry Imaging (MSI) data. This provides a particularly straightforward procedure for obtaining both MS/MS data and Mass Spectrometry Imaging (MSI) data.

Various embodiments allow peaks within the spatially resolved data to be annotated with molecular identities. This allows a user to straightforwardly determine the spatial distribution of a particular compound (such as for example xanthine) in their sample (instead of just being able to determine that there is a peak at a particular mass to charge ratio value (such as for example m/z 151) which is of high intensity in a certain area).

In accordance with various embodiments, the Applicant has recognised that Desorption electrospray ionisation (DESI) mass spectrometry analysis of a surface allows the same surface to be resampled with comparable response. The Applicant has also recognised Time of Flight mass spectrometers can have sufficient mass accuracy and mass resolution to provide a list of possible molecular identifications based on database matching.

Thus, in accordance with various embodiments, a Time of Flight mass spectrometer is operated in a Data Directed Acquisition (DDA) mode of operation so as to collect a large number of MS/MS spectra at high sampling rates (in the manner described above).

As described above, the MS/MS spectra to be collected can be directed either by a survey scan or an externally built list. As also described above, exclusion lists for the DDA algorithm can be built in real time.

Various embodiments provide an imaging experiment workflow comprising the following steps.

Before sample imaging, a known compound may be analysed as a lock-mass. The known compound may be located, for example, at a reference point on the imaging sample stage. Alternatively a known compound may be introduced into the DESI spray solvent. Other lock mass arrangements would be possible.

The sample may then be imaged by DESI (or MALDI, REIMS, and the like) mass spectrometry imaging, with periodic lock-mass acquisition as required.

Optionally, a light-weight representation of the data may be created during the analysis for evaluation upon completion of the primary analysis.

After imaging, a lock-mass analysis may be conducted again.

The data may then be processed and evaluated in preparation for the subsequent DDA analysis.

The DDA analysis may be carried out on the same sample based on the outcome of the processing and evaluation step.

Prior to the DDA analysis, an automated statistical analysis of the data may be performed and a decision may be made regarding the sample.

For example, there may be an integer number of different regions in the sample, and each region may be analysed by an exhaustive exclusion list approach (as described above) where sets of survey and MS/MS analyses are carried out until no new peaks (of interest) are found.

Figure 3A:
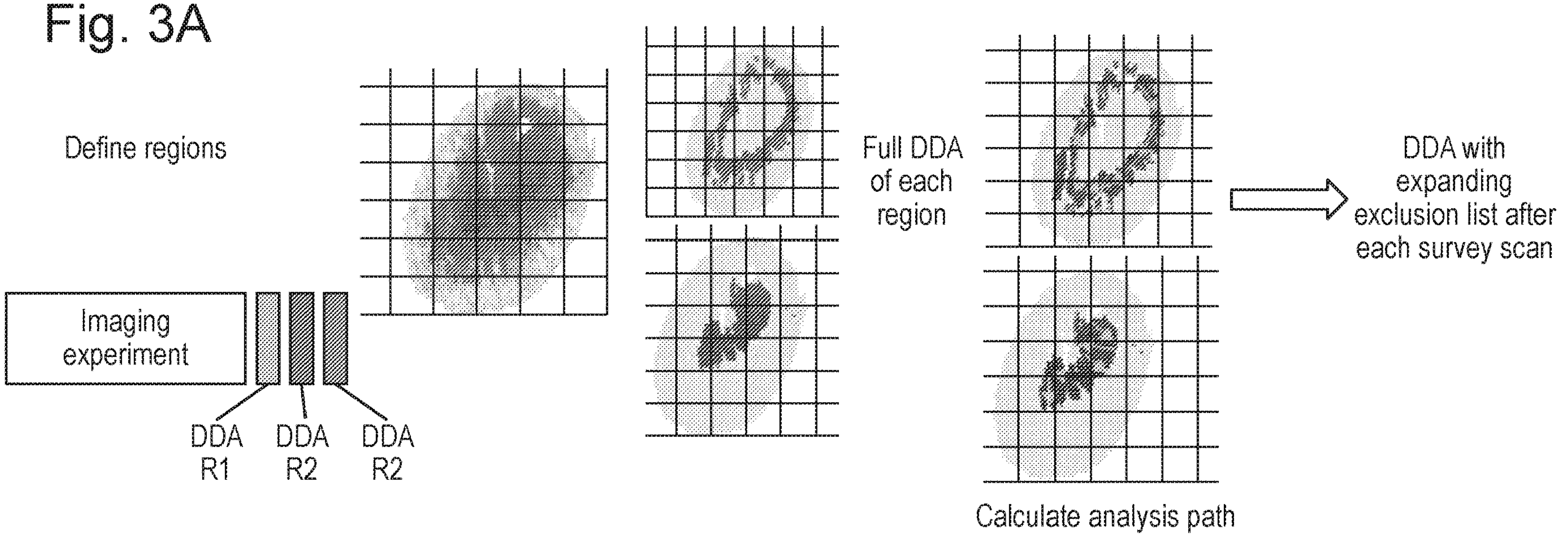
FIG. 3A shows a first workflow in accordance with various embodiments.

FIG. 3A illustrates an example workflow in accordance with this embodiment. As shown in FIG. 3A, a sample is analysed in an imaging experiment, and the resulting data is analysed so as to identify three regions, R1, R2 and R3.

Each of the three regions is then subject to a full data direction analysis (DDA). This is done by calculating an analysis path for each of the regions, and then analysing the sample along the path by repeatedly switching between a parent ion survey scan (mass spectrometry) mode of operation, and a tandem mass spectrometry (MS/MS) mode of operation (as described above). An exclusion list approach is used whereby the exclusion list is added to after each survey scan.

Alternatively, there may be an integer number of peaks which are of a high level of interest identified by statistical analysis of the imaging data, and these may be used to create the DDA list (as described above).

Figure 3B:
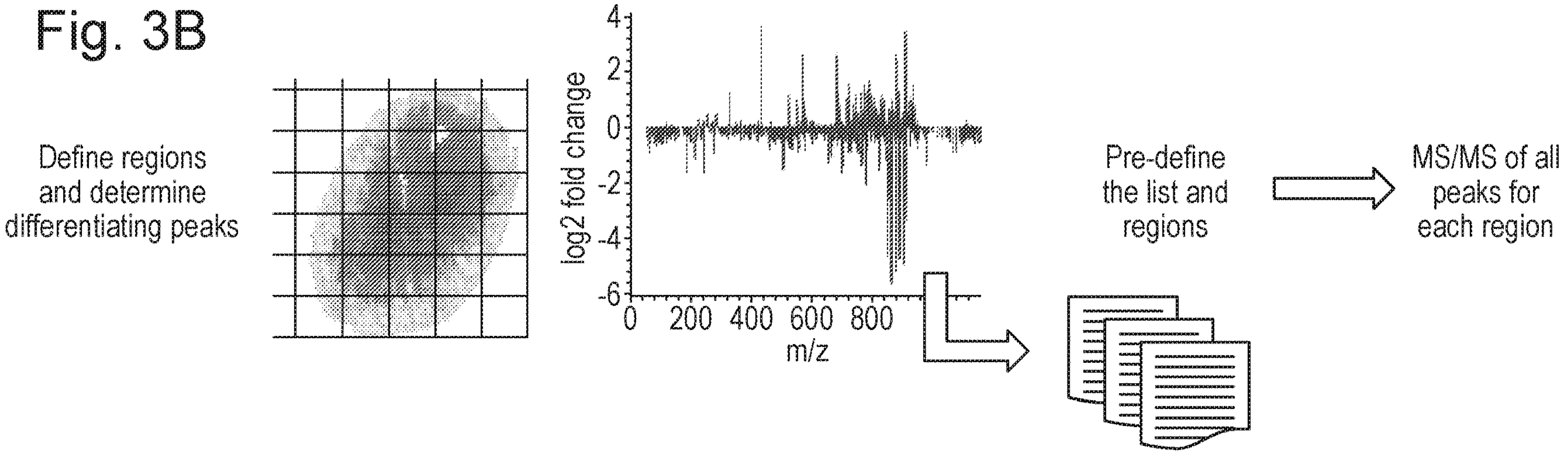
FIG. 3B shows a second workflow in accordance with various embodiments.

FIG. 3B illustrates an example workflow in accordance with this embodiment. As shown in FIG. 3B, a sample is analysed in an imaging experiment, and the resulting data is analysed so as to identify three regions, R1, R2 and R3. The data from the imaging experiment is then used to determine parent ions for which product ion data is desired, and these parent ions are then analysed to obtain MS/MS data.

In this the second approach (of FIG. 3B), where a peak list is generated from the imaging data, it is desirable for all the possible peaks of interest to be present in the imaging data. A spectrum may be generated for each identified region (for example by reducing the imaging data), and a peak list may be generated for each region from the region's spectrum. Any suitable approach may be used to create the per region peak list for the MS/MS analysis, as there may be sufficient quality in the data and sufficient time to do the data processing.

However, where for example the imaging data is to be performed at a high spatial resolution, it may be desirable to acquire the imaging data at high scan rates. In this case, even by summing the data from all the pixels in a region, it is possible that some compound peaks may be lost to the noise. It may therefore be desirable to use the first approach (of FIG. 3A) in these circumstances. Similarly, where the regions have been identified from an optical or spectroscopic approach (as described above) then as there will be no prior knowledge of the mass spectrometric response of the sample, the first "true DDA" approach may be used.

Figure 4:
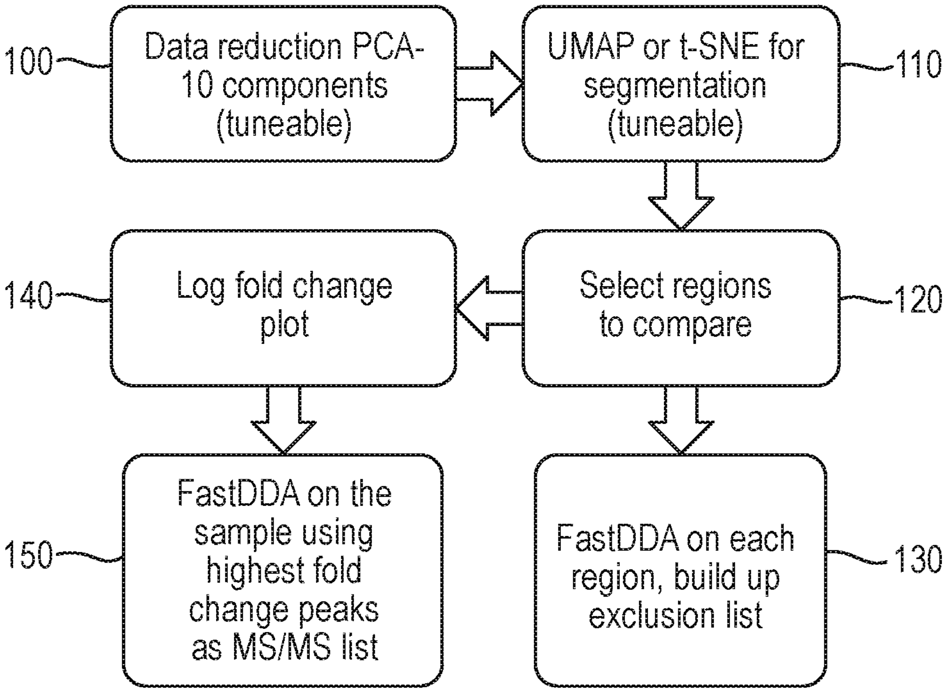
FIG. 4 shows a workflow in accordance with various embodiments.

FIG. 4 shows an example data processing workflow in accordance with various embodiments. As shown in FIG. 4, the data may be reduced, for example using tuneable principal component analysis (PCA) (step 100), followed by tuneable uniform manifold approximation and projection (UMAP) or T-distributed Stochastic Neighbour Embedding (t-SNE) (step 110). For each identified region (step 120), the DDA analysis may be performed on each region using an exclusion list approach (step 130).

Additionally or alternatively a log fold change plot may be produced (step 140), and the DDA analysis may be performed using the highest fold change peaks (step 150).

The DDA analysis may be conducted by moving the sample under the analysis probe whilst ensuring that the same chemically distinct region of sample is being analysed (as described above). The control system 50 may define the co-ordinates of the route to be taken and may synchronise the stage pattern to the MS analysis.

It will be appreciated that the additional time for the DDA analysis will be a small fraction of the total time required for the analysis, and that the data size of the DDA files will be much smaller than the full imaging data. As such, embodiments cause minimal overheads while providing a significant benefit.

Figure 5:
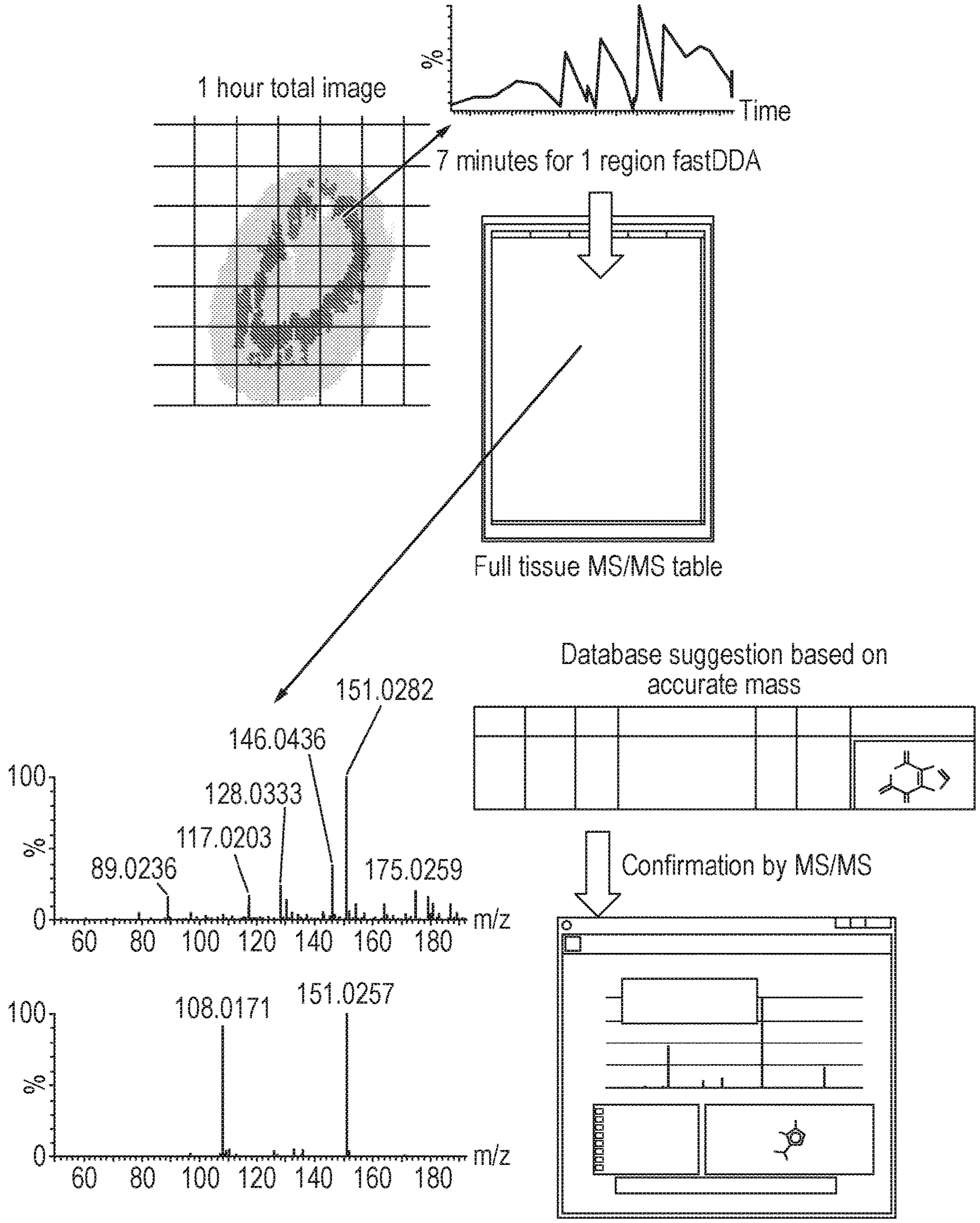
FIG. 5 shows a workflow in accordance with various embodiments.

This is illustrated by FIG. 5. As shown in FIG. 5, the initial imaging experiment may take a time on the order of a few tens of minutes or a few hours (such as around 1 hour). The subsequent DDA analysis, however may take a time on the order of a few minutes for each region (such as for example around 7 minutes).

As also illustrated by FIG. 5, various embodiments ensure that not only can the user submit mass to charge ratio (m/z) values of interest to be matched against known molecular databases, but in addition they will have MS/MS data for those peaks to aid in the identification of the specific molecule that is attributed to that MSI distribution.

Although the present invention has been described with reference to preferred embodiments, it will be understood by those skilled in the art that various changes in form and detail may be made without departing from the scope of the invention as set forth in the accompanying claims.

The invention claimed is:

1. A method of analysing a sample, the method comprising:

analysing a sample in a first mode of operation so as to produce a spatially resolved data set representative of the sample;

analysing the data set so as to identify one or more chemically distinct and substantially homogenous regions of the sample; and for each of one or more identified regions of the sample, producing a tandem mass spectrometry (MS/MS) data set for that region by:

determining a path through the region; and analysing the sample along the path by analysing the sample along at least part of the path using Desorption Electrospray Ionisation ("DESI") in a tandem mass spectrometry (MS/MS) mode of operation, wherein analysing the sample along the path comprises:

analysing the sample along a first portion of the path in a mass spectrometry mode of operation so as to produce mass spectrometry data;

determining one or more parent ions of interest from the mass spectrometry data; and then analysing the sample along a second different portion of the path in the tandem mass spectrometry (MS/MS) mode of operation by analysing ions that correspond to said one or more determined parent ions of interest.

2. The method as claimed in claim 1, wherein the first mode of operation is a Data Independent Analysis (DIA) mode of operation.

3. The method as claimed in claim 1, wherein the spatially resolved data set comprises a mass spectrometry image of the sample.

4. The method of claim 1, wherein the spatially resolved data set comprises an optical, IR or UV image of the sample, a fluorescence image of the sample, or a Raman spectroscopy image of the sample.

5. The method of claim 1, wherein analysing the sample along the path comprises:

switching between a mass spectrometry ("MS") mode of operation and a tandem mass spectrometry ("MS/MS") mode of operation plural times while analysing the sample along the path;

determining, from the results of each respective mass spectrometry ("MS") mode of operation one or more parent ions of interest to be analysed in the subsequent tandem mass spectrometry ("MS/MS") mode of operation; and analysing each of the determined one or more parents ions of interest in the subsequent tandem mass spectrometry ("MS/MS") mode of operation so as to produce a product ion spectrum for each parent ion.

6. The method of claim 5, wherein parent ions of interest which have already been analysed in a preceding tandem mass spectrometry ("MS/MS") mode of operation are excluded from analysis in any subsequent tandem mass spectrometry ("MS/MS") mode of operation.

7. The method of claim 1, wherein analysing the sample in a tandem mass spectrometry (MS/MS) mode of operation comprises:

selecting at least one parent ion of interest;

activating, fragmenting or reacting the at least one parent ion so as to produce product ions; and analysing the product ions so as to produce a product ion data set for the at least one parent ion of interest.

8. The method of claim 1, further comprising associating the tandem mass spectrometry (MS/MS) data set for each region with spatially resolved mass spectrometry data for that region so as to produce a spatially resolved mass spectrometry data set representative of the sample that is supplemented with a tandem mass spectrometry (MS/MS) data set in respect of each of the one or more identified regions of the sample.

9. The method of claim 1, further comprising analysing mass spectrometry data and tandem mass spectrometry (MS/MS) data for a region so as to classify the region.

10. An analytical instrument comprising:

a Desorption Electrospray Ionisation ("DESI") ion source configured to produce ions from a sample;

one or more analysers configured to analyse a sample; and a control system configured to cause the analytical instrument to:

analyse a sample in a first mode of operation so as to produce a spatially resolved data set representative of the sample;

analyse the data set so as to identify one or more chemically distinct and substantially homogenous regions of the sample; and for each of one or more identified regions of the sample, produce a tandem mass spectrometry (MS/MS) data set for that region by:

determining a path through the region; and analysing the sample along the path by analysing the sample along at least part of the path using the Desorption Electrospray Ionisation ("DESI") ion source in a tandem mass spectrometry (MS/MS) mode of operation;

wherein the control system is configured to cause the analytical instrument to analyse the sample along the path by:

analysing the sample along a first portion of the path in a mass spectrometry mode of operation so as to produce mass spectrometry data;

determining one or more parent ions of interest from the mass spectrometry data; and then analysing the sample along a second different portion of the path in the tandem mass spectrometry (MS/MS) mode of operation by analysing ions that correspond to said one or more determined parent ions of interest.

11. The analytical instrument of claim 10, wherein the analytical instrument comprises a mass analyser.

12. The analytical instrument of claim 10, further comprising a filter and an activation, collision, fragmentation or reaction device.

13. The analytical instrument of claim 10, further comprising a sample stage and an analysis probe; wherein:

the sample stage is configured to be moveable relative to the analysis probe and/or the analysis probe is configured to be moveable relative to the sample stage.

14. An analytical instrument comprising:

a Desorption Electrospray Ionisation ("DESI") ion source configured to produce ions from a sample;

one or more analysers configured to analyse a sample; and a control system configured to cause the analytical instrument to:

analyse a sample in a first mode of operation so as to produce a spatially resolved data set representative of the sample;

analyse the spatially resolved data set so as to identify one or more chemically distinct and substantially homogenous regions of the sample;

determine one or more parent ions of interest for each of one or more identified regions of the sample from the spatially resolved data set; and for each of the one or more identified regions of the sample, produce a tandem mass spectrometry (MS/MS) data set for that region by:

determining a path through the region; and analysing the sample along the path by analysing the sample along at least part of the path using the Desorption Electrospray Ionisation ("DESI") ion source in a tandem mass spectrometry (MS/MS) mode of operation, wherein the control system is configured to cause the analytical instrument to analyse the sample along the path in the tandem mass spectrometry (MS/MS) mode of operation by analysing ions that correspond to the one or more determined parent ions of interest for the region.

15. The analytical instrument of claim 14, wherein the control system is configured to determine a plurality of parent ions of interest for each of the one or more identified regions of the sample, and wherein as the analysis of the sample moves along the path different parent ions of the plurality of parent ions of interest are sequentially selected for analysis.

16. The analytical instrument of claim 14, wherein the first mode of operation is a Data Independent Analysis (DIA) mode of operation.

17. The analytical instrument of claim 14, wherein the spatially resolved data set comprises a mass spectrometry image of the sample.

18. A method of analysing a sample, the method comprising:

providing an analytical instrument as claimed in claim 14; and using the control system to cause the analytical instrument to:

produce the spatially resolved data set representative of the sample;

identify the one or more chemically distinct and substantially homogenous regions of the sample; and produce the tandem mass spectrometry (MS/MS) data set for each of the one or more identified regions of the sample.

* * * * *